Sept. 10, 1940.  T. A. STEHLIN  2,213,970
VACUUM BRAKING SYSTEM
Original Filed April 4, 1934  2 Sheets-Sheet 1

INVENTOR
Theodore A. Stehlin
BY Theodore A. Stehlin
ATTORNEY

Sept. 10, 1940.  T. A. STEHLIN  2,213,970
VACUUM BRAKING SYSTEM
Original Filed April 4, 1934   2 Sheets-Sheet 2
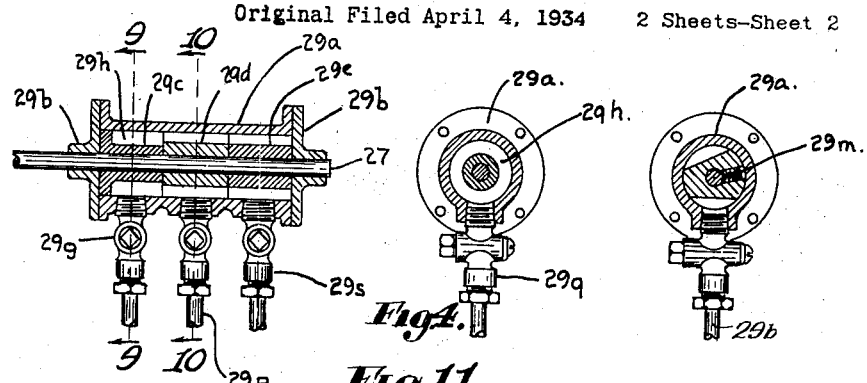
Fig. 3.  Fig. 4.  Fig. 5.
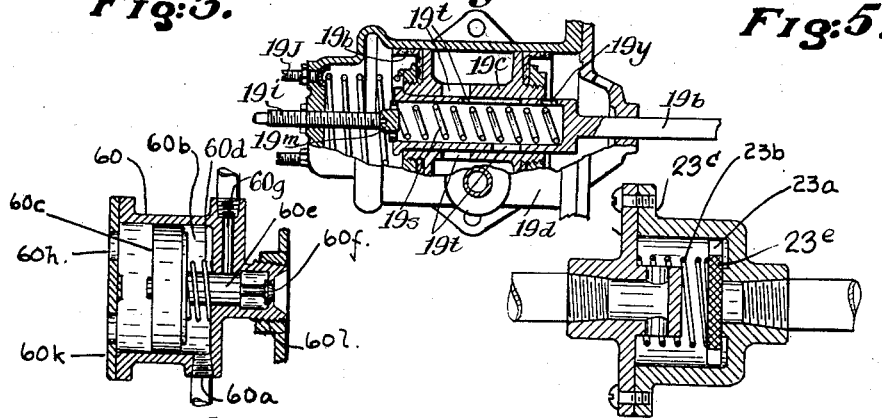
Fig. 6.  Fig. 7.
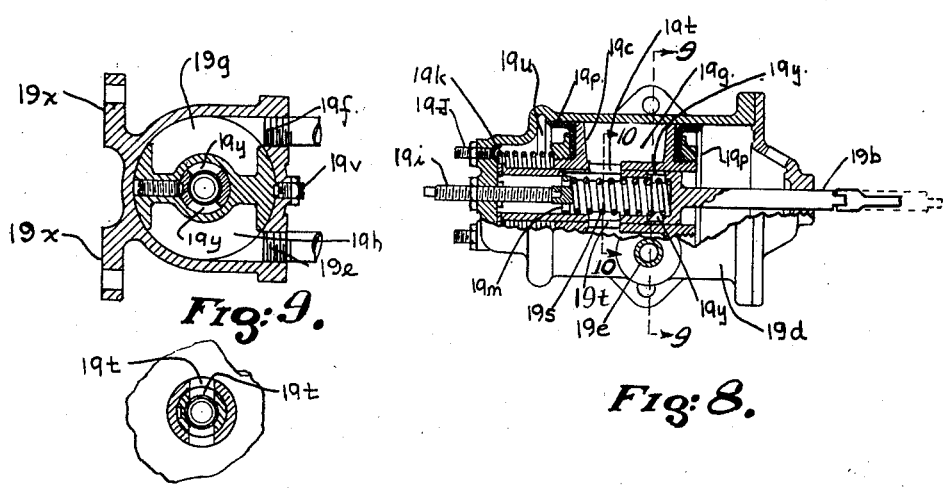
Fig. 9.  Fig. 8.
Fig. 10.
INVENTOR
Theodore A. Stehlin.
BY Theodore A. Stehlin
ATTORNEY Patented Sept. 10, 1940

2,213,970

UNITED STATES PATENT OFFICE 2,213,970

VACUUM BRAKING SYSTEM

Theodore A. Stehlin, Los Angeles, Calif., assignor to T. Clifford Melim, Honolulu, Territory of Hawaii Application April 4, 1934, Serial No. 718,949
Renewed October 5, 1939

9 Claims. (Cl. 188—3)

This invention has relation to wheel brakes and refers particularly to improved means for controlling the brake mechanism of vehicle wheels. The objects of the invention are:

First. To provide new and improved brake mechanisms of great flexibility and selectivity, Second. To provide a novel vacuum operated brake mechanism, Third. To provide means for continuously and automatically maintaining a sufficient degree of vacuum to insure proper operation of the brake mechanism while the vehicle is in operation, Fourth. To provide means for controlling the action of the brake mechanism in a predetermined, orderly fashion, in order that the braking action always may be effected smoothly and without sudden shocks, Fifth. To provide means whereby the operator may determine the sequence of brake setting in order that, particularly where trailers are employed, the brake setting of the individual wheels may be timed to stop the vehicle, or vehicles smoothly, without danger of overturning or collision between the vehicles.

Sixth. To provide means, where trailers are employed, for automatically setting the brakes of such trailers, in case the connection between the trailers and the tractor vehicle should accidentally become disrupted.

Seventh. To provide a novel brake system in which vacuum operated brakes are normally subjected to atmospheric pressure and are operated by atmospheric pressure in proportion to the amount of vacuum applied thereto.

Eighth. To provide a novelly constructed and operated control or metering valve for such a braking system.

Ninth. To provide improved wheel brake mechanism.

Referring to the drawings, in which similar numerals represent the same parts throughout the several views, Figure 1 is a plan view and diagrammatically indicates the equipment and connections to and from such equipment necessary for the use of my vacuum braking system as applicable to any self-propelled vehicle when operated on land.

Figure 3 is a longitudinal sectional view of the multi-chambered valved manifold, by which distribution of vacuum energy is had to vacuum operated apparatus and equipment.

Figures 4 and 5 are, respectively, sectional views taken through 9—9 and 10—10 of Fig. 8.

Figure 6 is a cross sectional view of the atmospherically operated emergency application valve used, on vehicles which are not self-propelled, to apply vacuum brake in an emergency.

Figure 7 is a longitudinal sectional view of a vacuum check valve used to prevent infiltration to vacuum reservoir.

Figure 8 is a longitudinal partial sectional view of my vacuum control or vacuum metering valve.

Figure 9 is a sectional view of the same valve taken on dotted line 14—14, Figure 8.

Figure 10 is a sectional view of a portion of the same valve taken on dotted line 15—15.

Fig. 11 is a sectional view showing the device of Fig. 8 in normal, inoperative position.

Figure 1:
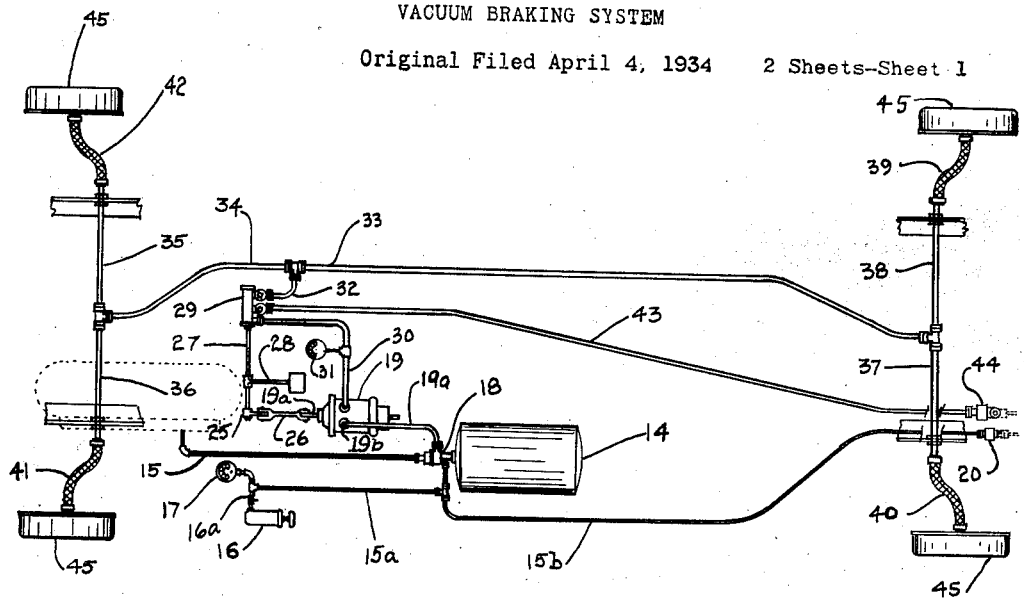

Referring in detail to these drawings of my vacuum braking system, 14 of Figure 1 represents a primary or service vacuum storage reservoir which is attached to any self-propelled vehicle, operated on land and propelled by means of an internal combustion engine. A degree of vacuum is induced in the reservoir 14 by means of connection 15a to a manually or mechanically operated vacuum pump 16, and by means of connection 15 to intake manifold of internal combustion engine, the said reservoir 14 being sealed against dilution or air infiltration from either or any of these vacuum sources by means of a check valve 18 in the principal vacuum connection, and a cock 16a in the secondary vacuum connection. Directly connected to the reservoir 14 is a vacuum gauge 17 for indicating the vacuum amount in the vacuum storage reservoir 14.

For the induction of a degree of vacuum in secondary or auxiliary vacuum storage reservoirs, attached to one or more succeeding vehicles which are not self-propelled and which depend upon the before mentioned self-propelled vehicle for propulsion, an extension vacuum induction connection 15b is provided, said connection 15b terminating at the end or ends of said self-propelled vehicle in a suitable connection valve 20, and said connection valve 20 being a valve which is opened in and by the act of connecting it to another connection and which is automatically closed when disconnected so as to prevent dilution and/or infiltration of atmosphere to said primary reservoir 14. By a suitable flexible connection between valve 20 of Figure 1 and fitting 21 of Figure 2, and the connections 22 and 22a to a vacuum check valve 23, which in turn is connected with the auxiliary reservoir 24, an induction of a degree of vacuum is furnished to the said auxiliary or emergency vacuum storage reservoir 24, said reservoir 24 being protected against atmospheric infiltration by means of the check valve 23 of Figure 2 and Figure 7 of the drawings. Said check valve consists of a valve disc having along its circumference notches 23a and it is held against a seat by means of a spring 23b, which is in turn enclosed and housed by means of the casing 23c and casing cover 23d, said member 23c and 23d having threaded passages or ducts for connecting to a vacuum line so that induction of a degree of vacuum in the ports or passage way of 23d will lift valve disc 23a from off its seat of member 23c and allow vacuum conditions to continue to duct or passage way of member 23c, and to any equipment or apparatus connected thereto. The disc, designated 23e, is slightly smaller than the bore of the casing 23c, but the notches allow free passage between the opposite sides. The notches 23a of valve disc provides a total area of passage equal to the area of the threaded passages of member 23d and 23c.

Thus is described the new and useful improvement by which I conserve vacuum for my vacuum braking system, this being the first step of my invention and necessary to the invention as a complete system.

The supply of vacuum energy reserved or stored in the before mentioned reservoir 14 is available for use to operate vacuum operated apparatus and/or vacuum brake in a conserved or controlled or metered manner by means of a vacuum metering or vacuum controlling valve 19 which through a port 19e is connected to the said reservoir 14 by a suitable connection 19a. A second port 19f leads from the control valve to the brakes, as will presently be explained. The valve casing 19d is at one end perforated to receive a plunger 19b, the outer end of which, by a link 26, is connected to an arm 25 of a rockshaft 27, and the latter carries a footlever 28, all as indicated in Fig. 1. A spring 19s urges the plunger into the extreme position of Fig. 16.

The inner end of the plunger is enlarged to form a hollow, cylindrical head, on which a flanged valve member 19c is fitted to slide. Intermediate the annular flanges, this member is made with a partition which divides the space between the flanges into an upper chamber 19g and a lower chamber 19h. Ports 19t are cut in axial alignment into the plunger and the valve member. These ports are normally, that is, while the control valve is not in operation, out of registration, see Fig. 11, but they are brought into registration to set the brakes, as will now be described. In the plunger head are cut two more ports 19y, which normally are positioned outside the valve member 19c to open communication from within the plunger head, through a port in the valve casing, with the atmosphere.

The valve ports of the members 19b and 19c are kept in longitudinal alignment by means of key-ways and set-screws, as shown in Figure 9. Said key-ways and set-screws also prevent axial rotation of either valve member 19b and 19c.

The spring adjusting screw 19i and screws 19j, together with the pressure ring 19k and ported pressure head 19m, provide adjustable means of cushioning the movement of valve member 19b and 19c.

The cup leathers 19p—19p prevent infiltration of atmospheric air into housing 19d, and also seal the chambers 19g and 19h of floating valve member 19c.

Upon careful study, by those versed in the art, it should be readily understood that this relative movement of the two members is very important. If the valve member 19c were a stationary part, it is seen that an advance movement of the plunger to bring the ports 19t into registration would result in a sudden air rush causing instant setting of the brakes but, because the member 19c is able to move partially with the plunger, in response to differences in air pressure, no such sudden brake action can occur.

The two members will co-operate to set the brakes at a certain more or less uniform rate of speed, no matter with what speed the plunger 19b is manually advanced. This speed of application is governed by the relative proportions of the two members and their ports 19t and 19t. The time before the braking action commences to take place will vary with the speed of movement of the plunger but, once having commenced, the braking will be effected in a uniformly accelerated manner.

The spring 19s commences to return the plunger 19b the moment the footlever is released, to reestablish communication between the chambers 19g and 19u, through the passage 19m. Behind the member 19c is a spring which now is free to return this member to its initial position, following the return movement of the plunger.

This vacuum control valve 19 is permanently affixed or attached to any desired vehicle member by means of the two lugs or feet 19x and 19x and bolts.

Thus are illustrated and described the new and useful improvements by which I control or meter vacuum furnished to vacuum operated apparatus and/or brakes for my vacuum braking system, this being the second step of my invention and necessary to the invention as a complete system.

In my vacuum braking system as illustrated by Figure 1 I have provided for the distribution of my conserved energy by means of a valved, manually operated manifold 29 which is directly piped or connected to the vacuum control valve 19 by means of the connection 30, Figure 1. Also, in this connection 30 is included a vacuum gauge 31 by means of which the amount of controlled or metered vacuum delivered by the control valve 19 to vacuum operated apparatus and/or brakes may be observed.

The distributing manifold 29 is further illustrated by means of Figure 3, Figure 4 and Figure 5, and consists of a cylindrical housing within which is formed a chamber 29a and two cylinder heads or end plates 29b—29b, which enclose and encase the valve parts 29c, 29d and 29e, mounted on the shaft 27.

By means of the connection 29g and the areaway or chamber 29h, controlled or metered vacuum energy is admitted into the chamber 29a; and by means of the valve members 29d and 29e, which are adjustably mounted on the shaft 27 by use of set-screws 29m, controlled or metered vacuum energy is distributed to one or more connected apparati and/or brakes through the connection or connections such as 29p and 29s. Referring to Fig. 1, it is seen that the rod 27 carries the footlever 28 and connects with the control valve 19, through the medium of the link 26 and that, each time the footlever is depressed, a partial rotation is imparted to the rod 27, carrying the valve parts 29d and 29e. The valve part 29d is shown controlling communication with the trailer brakes and the part 29e with the tractor vehicle brakes. These parts may be manually adjusted to open communication with the trailer brakes first or, if more valve parts are added, as above suggested, to control communication with additional trailers or individual wheels. In this manner, it is seen that a desired sequence of brake operation may be prearranged and that, for this reason, the distributing device 29 functions as a selecting means for brake operation sequence.

This being the third step of my invention and necessary to the new and useful improvement to vacuum braking system which I claim to have discovered.

Thus far I have described the method and means used to conserve and control and distribute vacuum energy used for my vacuum braking system, the final step of which is that of application, or the actual braking operation, which includes the vacuum brakes on self-propelled vehicles and the necessary connection thereto for applying these brakes.

Figure 2:
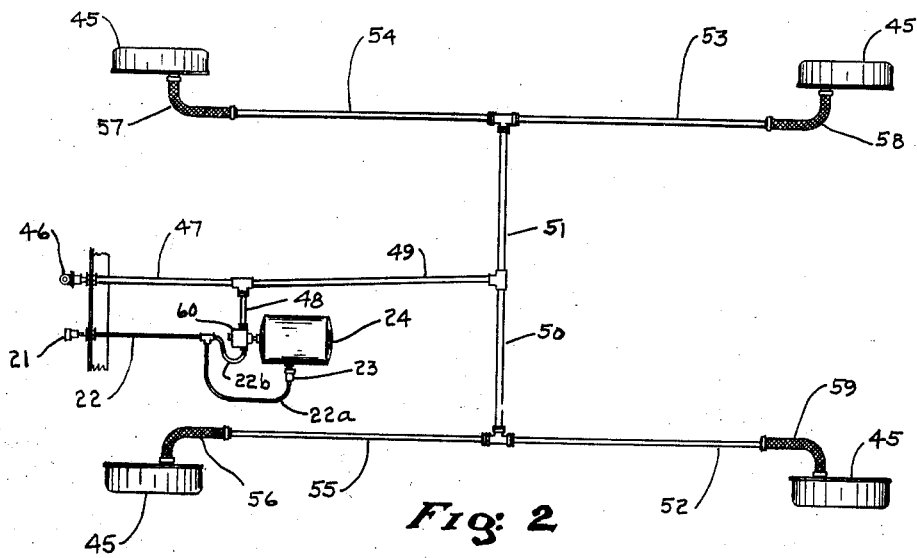
Figure 2 is a plan view and diagrammatically indicates the equipment and connections to and from such equipment for the use of my vacuum braking system as applicable to any one or more towed or hauled or pushed vehicles, or vehicles not self-propelled but which are attached to or moved by self-propelled vehicles.

Referring to Figure 1, I have indicated by 32, 33, 34, 35, 36, 37, 38, 39, 40, 41 and 42 the connection from distributing manifold 29 to the vacuum brakes 45—45—45—45 of a self-propelled vehicle; and by means of 43 and 44 of Figure 1, and 46, 47, 48, 49, 50, 51, 52, 53, 54, 55, 56, 57, 58 and 59 of Figure 2, connections from distributing manifold 29 to the vacuum brakes 45—45—45—45, Figure 2 of the non-self-propelled vehicle connected to or being pulled or pushed by the said attached self-propelled vehicle.

By these connections is made possible, communication to the vacuum operated brakes 45 from the vacuum reserve supply stored in the tank 14 and metered and distributed by means of the control valve 19 and distributing manifold 29.

In my invention I have provided for control of that attached, non-self-propelled vehicle in connection and conjunction with the before mentioned self-propelled vehicle, this being accomplished by means of the distributing manifold 29 and connections therefrom 43, 44, 46, 47, 49, 50, 51, 52, 53, 54, 55, 56, 57, 58 and 59 to the vacuum operated brakes 45—45—45—45, of which 44 and 46 are terminal connections for the propelled and non-propelled vehicle as well as terminal connections of a flexible connection between these two before mentioned vehicles. When in a connected condition, the vacuum energy or release is communicated to the brakes 45; when in a disconnected condition at either end of the flexible connection, the lines 43 and 47 are sealed automatically against atmosphere by means of automatically closing valves in either end of the flexible connection.

In my invention I have provided also for the automatic application of vacuum operated brakes of attached non-self-propelled vehicles by use of the auxiliary reserve vacuum supply reservoir 24 and the emergency application valve 60, Figure 2, and shown in detail by Figure 6, said valve 60 being connected with the same source of vacuum as is the service vacuum reservoir 14, by means of connections 22 and 22b, which are connected to the vacuum chamber 60b, Figure 7, at the point indicated as 60a in the valve housing 60.

Vacuum induced in the chamber 60b acts upon the piston 60c, causing it to compress the spring 60d and seat the piston valve 60f, at the same time closing of the port 60g is accomplished by the piston rod 60e, thereby sealing the valve 60 from action of either vacuum or vacuum release through the said port 60g, thus preventing the vacuum energy of the emergency reservoir 24 from being communicated with brakes of the vehicles. However, whether by accident or by intent, should vacuum connection 21 and 22 be disconnected from the vacuum source or sources so as to permit atmosphere to enter the chamber 60b or the valve 60, the spring 60d will force piston valve 60c against the cylinder head 60k, opening the port 60g and the valve seat 60f, allowing the stored vacuum energy in reservoir 24 to reach vacuum operated brakes of the non-propelled vehicle and apply them.

Thus is provided both service and emergency application of brakes to any attached vehicle or vehicles to any self-propelled vehicles.

Having thus described and illustrated my invention and indicated by illustrations and descriptions the method and means whereby I conserve, control, distribute and apply any degree of a vacuum obtainable to any vacuum operated equipment and/or brake of a self-propelled and non-self-propelled motor or other vehicle, what I claim as new and desire to obtain by Letters Patent is:

I claim:

1. In a vacuum operated brake system for vehicle wheels, means for maintaining a partial vacuum, wheel brake mechanisms normally subjected only to atmospheric pressure, a manual control lever, means shiftable by the lever for interconnecting said vacuum means with the said brake mechanisms for actuating the latter by atmospheric pressure in proportion to the shifting of the lever for admitting a partial vacuum to the brake mechanism, and means for translating the variable operation of said control lever into a predetermined substantially uniform setting of the brakes.

2. In a vacuum operated brake system for the wheels of a tractor vehicle and trailers, a tank on said tractor vehicle, auxiliary tanks on said trailers, wheel brakes on the tractor and trailers, each normally subjected only to atmospheric pressure, a valve controlling connections from said tanks to the said brakes, the auxiliary tanks having connection to but not from said first tank, a manual lever for controlling said valve, means within the valve for translating variable operations of said lever into predetermined substantially uniform brake settings by atmospheric pressure in proportion to the shifting of the lever for admitting partial vacuum to the brake mechanisms, and means associated with said auxiliary tanks for similar setting trailer brakes when connection with the tractor vehicle is disrupted.

3. In a vacuum operated brake system for vehicle wheels, means for maintaining a partial vacuum, wheel brakes, means interconnecting said brakes with the first means, manual control means in said interconnecting means, and manual selecting means operable with said control means comprising, a series of valves, means connecting said valves, said valves being independently adjustable with respect to each other and to said connecting means, to determine the timing of the setting of the various wheel brakes.

4. In a vacuum operated brake system for vehicle wheels, means for maintaining a partial vacuum, wheel brake mechanisms normally subjected only to atmospheric pressure, a manual control lever, means shiftable by the lever for interconnecting said vacuum means with the said brake mechanisms for actuating the latter by atmospheric pressure in proportion to the shifting of the lever for admitting a partial vacuum to the brake mechanisms, and means for translating the variable operation of said control lever into a predetermined substantially uniform setting of the brakes of the mechanisms.

5. In a vacuum operated brake system for vehicle wheels, means for maintaining a partial vacuum, wheel brake mechanisms normally subjected only to atmospheric pressure, a manual control lever, means shiftable by the lever for interconnecting said vacuum means with the said brake mechanisms for actuating the latter by atmospheric pressure in proportion to the shifting of the lever for admitting a partial vacuum to the brake mechanisms, and a piston within the shiftable interconnecting means actuated by the vacuum when the latter means is operated for translating the variable operation of said control lever into a predetermined substantially uniform setting of the brakes, of the mechanisms.

6. In a vacuum operated brake system for the wheels of a tractor vehicle and trailers, a tank on said tractor vehicle, an auxiliary tank on said trailer, wheel brakes on the tractor and trailer, each normally subjected only to atmospheric pressure, a valve controlling connections from said first tank to the said brakes, the auxiliary tank having connection to but not from said first tank, a manual lever for controlling said valve, means within the valve for translating variable operations of said lever into predetermined substantially uniform brake settings by atmospheric pressure in proportion to the shifting of the lever for admitting partial vacuum to the brakes, and means associated with said auxiliary tank for similar setting of said trailer brakes when connection with the tractor vehicle is disrupted.

7. In a vacuum operated brake system for the wheels of a tractor vehicle and trailers, a tank on said tractor vehicle, an auxiliary tank on said trailer, wheel brakes on the tractor and trailer, each normally subjected only to atmospheric pressure, a valve controlling connections from said first tank to the said brakes, the auxiliary tank having connection to but not from said first tank, a manual lever for controlling said valve, a piston within the valve and actuated by the vacuum when the valve is operated for translating variable operations of said lever into predetermined substantially uniform brake settings by atmospheric pressure in proportion to the shifting of the lever for admitting partial vacuum to the brakes, and means associated with said auxiliary tank for similar setting of said trailer brakes when connection with the tractor vehicle is disrupted.

8. In a fluid pressure operated brake system for vehicle wheels, means for maintaining a fluid pressure, wheel brakes, means interconnecting said brakes with the first means, manual control means in said interconnecting means, and manual selecting means operable with said control means comprising, a series of valves, means connecting said valves, said valves being independently adjustable with respect to each other and to said valve connecting means, to determine the timing of the setting of the various wheel brakes.

9. In a vacuum operated brake system for vehicle wheels, means for maintaining a partial vacuum, wheel brakes, means interconnecting said brakes with the first means, manual control means in said interconnecting means, and manual selecting means operable with said control means comprising, a series of valves, means connecting said valves, said valves being independently adjustable with respect to each other and to said valve connecting means, to determine the timing of the setting of the various wheel brakes.

THEODORE A. STEHLIN.